United States Patent [19]

Leclercq et al.

[11] 4,123,244
[45] Oct. 31, 1978

[54] PROCESS OF FORMING A METAL OR METAL COMPOUND COATING ON A FACE OF A GLASS SUBSTRATE AND APPARATUS SUITABLE FOR USE IN FORMING SUCH COATING

[75] Inventors: Robert Leclercq, Auvelais; Philéas Capouillet, Gosselies; Albert Van Cauter, Charleroi, all of Belgium

[73] Assignee: BFG Glassgroup, Paris, France

[21] Appl. No.: 781,958

[22] Filed: Mar. 28, 1977

[30] Foreign Application Priority Data

Apr. 13, 1976 [GB] United Kingdom ............... 15064/76

[51] Int. Cl.² .......................................... C03C 17/00
[52] U.S. Cl. .................... 65/60 C; 65/30 R; 65/30 E; 65/60 D; 65/99 A; 118/48; 118/49; 118/50; 118/50.1; 118/305; 118/326; 427/109; 427/110; 427/226; 427/229; 427/250; 427/251; 427/252; 427/255; 427/294; 427/314; 427/350; 427/424; 427/427
[58] Field of Search ............... 427/229, 314, 250–252, 427/255, 424, 427, 110, 109, 226, 294, 450; 118/305, 50, 50.1, 48, 326, 49; 65/60 D, 30 R, 30 A, 30 B, 60 C

[56] References Cited

U.S. PATENT DOCUMENTS

| | | | |
|---|---|---|---|
| 2,332,309 | 10/1943 | Drummond | 118/48 |
| 2,724,658 | 11/1955 | Lytle | 427/424 |
| 3,008,447 | 11/1961 | Lacroix | 118/48 |
| 3,660,061 | 5/1972 | Donley et al. | 65/30 R |
| 3,684,469 | 8/1972 | Goelzer et al. | 65/60 D |
| 3,925,050 | 12/1975 | Kushihashi et al. | 65/60 D |
| 4,019,887 | 4/1977 | Kirkbride et al. | 118/48 |
| 4,022,601 | 5/1977 | Sopko | 427/255 |

Primary Examiner—Ronald H. Smith
Assistant Examiner—Janyce A. Bell
Attorney, Agent, or Firm—Cushman, Darby & Cushman

[57] ABSTRACT

A process of forming a metal or metal compound coating on a face of a glass substrate which comprises the steps of contacting such face while it is at elevated temperature with a gaseous medium containing a substance in gaseous phase, which undergoes chemical reaction or decomposition to form the metal or metal compound on the face, causing the gaseous medium to flow along the face as a substantially turbulent-free layer along a flow passage which is defined in part by the face of the glass, and drawing residual medium away from the face through exhaust ducting into which the flow passage leads.

34 Claims, 4 Drawing Figures

PROCESS OF FORMING A METAL OR METAL COMPOUND COATING ON A FACE OF A GLASS SUBSTRATE AND APPARATUS SUITABLE FOR USE IN FORMING SUCH COATING

This invention relates to a process for forming a metal or metal compound coating on a face of a glass substrate by contacting such face while it is at elevated temperature with a gaseous medium containing a substance in gaseous phase, which substance undergoes chemical reaction or decomposition to form said metal or metal compound on said face. The invention also relates to apparatus for use in carrying out such a process.

Processes of the above kind are employed for forming coatings which modify the apparent color of the glass and/or which have some other required properties in respect of incident radiation, e.g. an infrared-reflecting property.

The known processes do not always enable coatings with satisfactory properties to be achieved. Difficulties are encountered in forming coatings sufficiently quickly to keep pace with industrial production programs and/or in forming coatings which are of satisfactory quality, e.g. in respect of their uniformity of thickness and their optical properties.

The subject of the patent application is a coating process which affords important advantages in respect of the reliability with which good quality coatings can be formed and/or of the high coating rates which are attainable.

The process according to the invention, which is of the kind above referred to, involves the improvement which comprises the steps of causing the gaseous medium to flow along the glass or substrate face to be coated as a substantially turbulent-free layer along a flow passage which is defined in part by the face of the glass and which leads to an exhaust ducting via which residual medium is drawn away from said face.

One factor contributing to the good results realizable by this process improvement is the establishment of a substantially turbulent-free flowing layer of the gaseous medium in contact with the face to be coated. The flow of gaseous medium along the flow passage is considered substantially turbulent-free if it is substantially free of local circulating currents or vortices giving rise to a substantial increase in the flow resistance. In other words, the flow is preferably laminar but undulation of the fluid or minor eddy currents can be tolerated provided that the required coating metal or metal compound is formed substantially only at the boundary layer in contact with the hot substrate surface and is not to any significant extent formed as a precipitate within the fluid stream.

Experiments indicate that as compared with hitherto known processes, the process according to the invention makes it easier to form a coating, e.g. a metal oxide coating, providing a uniform coverage of the substrate surface. The superiority of the new process appears to be particularly evident when attempting to build up coatings rapidly, e.g. at a rate of at least 700 Å of coating thickness per second. The invention therefore promises to be of special importance when coating glass ribbons, in course of continuous production at high speeds, e.g. speeds in excess of 2 meters per minute and even in excess of 10 meters per minute such as are often attained by the float process.

Spurious deposits on the substrate surface are more easily avoided if the flow passage within which the coating is formed is shallow. Preferably the height of the flow passage measured normally to the substrate face is at no point in excess of 40 mm. The flow passage may be of uniform height or the passage may increase or decrease in height along its length in the direction in which the gas flow takes place. It is advantageous for the height of the flow passage to decrease in the direction of gas flow therethrough, at least over an end portion of its length leading up to the exhaust ducting. By using a flow passage which tapers in that manner it is easier to avoid objectionable turbulence within the flowing layer of gas. Preferably, the flow passage tapers over at least the greater part of its length. An angle of taper of 10° or less is usually satisfactory.

For achieving the best results it is always desirable for the coating to be formed progressively on successive incremental portions of the substrate face. The invention can be utilized for continuously coating a face of a continuous ribbon of glass and in that case it is, of course, inevitable that the flow passage will occupy only a portion of the length of the face and the flow passage and substrate must be relatively displaced as the process proceeds. However, even when coating a sheet, it is preferable for the flow passage to occupy only an incremental portion of at least one dimension of the face area to be coated and to bring about relative displacement of the flow passage and substrate so as to form the coating progressively on successive portions of the face.

Preferably the aforesaid relative displacement occurs in a direction parallel with the direction in which gas flows along the flow passage. In this case, all of the successively coated portions of the face are exposed to the same coating conditions integrated over the length of the flow passage. However, in some cases good results can be obtained by bringing about such relative displacement in a direction normal to the gas flow direction along the substrate. For example, for coating a sheet, the flow passage may extend along one dimension of the sheet and extend across only a portion of the other dimension of the sheet and the latter can be displaced parallel with that other dimension.

The advantages of the process according to the invention are particularly notable when the process is employed for coating the top face of a ribbon of glass which is in continuous movement at a speed of at least 2 meters per minute, parallel with its longitudinal axis and in the direction of the gas flow through the aforesaid gas flow passage. The flow passage can be quite short, which is an important consideration in view of the limited space which is available in many plants for the production and treatment of continuous glass ribbons. Generally it is preferable for the length of the flow passage (i.e. its dimension measured in the direction of gas flow therethrough) to be not more than 2.0 meters. The length of the flow passage is, however, preferably in all cases not less than 10 cm.

The invention has been made primarily with a view to the formation of good quality metal oxide coatings on glass substrates. However, the invention can be utilized for forming coatings of other metal compounds, e.g. for forming a coating of a metallic boride, sulphide, nitride, carbide or arsenide by reacting a corresponding metallic or organometallic compound with a halogenated boron compound, $H_2S$, $NH_3$, $CH_4$, or an arsenic containing compound, in the absence of oxygen. The invention can also be applied for forming a metal coating. For example, a coating of nickel can be formed by decomposing nickel carbonyl under the action of heat provided by the heated substrate in a reducing atmosphere or at least in the absence of oxygen.

For forming a metal oxide coating, the invention includes processes wherein a stream of oxygen or oxygen-containing gas and a separate stream of a vaporized metal compound with which oxygen reacts to form a metal oxide coating on the substrate face are caused to flow continuously into the flow passage. A particular and important embodiment of the invention performed in that way employs a stream of a vaporized tin compound and a stream or streams of oxygen-containing gas for forming a tin oxide coating.

However, various other metal oxide coatings can be formed in that manner, e.g. a coating of titanium dioxide by reacting titanium tetrachloride with oxygen. The vaporized metal compound will usually be diluted with an intert gas, e.g. nitrogen and the vapor stream may contain additional ingredients for modifying the properties of the coating. For example, the vapor stream may contain antimony pentachloride for forming antimony dioxide together with the principal oxide ingredient of the coating.

In certain processes as above referred to for forming a metal oxide coating, a gas stream consisting of or containing a vaporized metal compound is continuously discharged into the aforesaid flow passage and induces a flow of air into and along such passage. In some cases, the gaseous medium entering the flow passage comprises a layer of vaporized metal compound and a layer of oxidizing gas which flows between the layer of vaporized metal compound and the substrate face being coated. When proceeding in that way, the flow of oxidizing gas, e.g. air, beneath the layer of vaporized metal compound, promotes rapid formation of the coating so that it commences to form on the substrate at or near the entry end of the flow passage.

In an alternative procedure, the gaseous medium entering the flow passage comprises an upper layer of oxidizing gas and a layer of vaporized metal compound which flows beneath such upper layer. The vaporized metal compound may enter the passage in contact with the face of the substrate in which case the upper layer of oxidizing gas tends to prevent the stream of vaporized metal compound from flowing upwardly away from the face of the substrate. A particularly advantageous feed system is one wherein a stream of vaporized metal compound enters the flow passage between overlying and underlying streams of oxidizing gas. The result is that the stream of vaporized metal compound is depressed away from the top surface of the flow passage, so avoiding or reducing tendency for oxide decomposition to occur on such surface, while at the same time a rapid formation of the metal oxide coating on the glass substrate is promoted by the lower stream of oxidizing gas.

As has already been indicated, it is an advantage of the invention that good quality coatings can be formed very rapidly. This potential advantage is realized in embodiments of the process wherein the composition of the gaseous medium flowing through the flow passage and the temperature conditions to which such medium is exposed are such that the coating forms on the substrate face at a rate of at least 700 Å per second. The process as thus performed can be utilized for forming optical coatings on a fast moving glass ribbon, e.g. a ribbon advancing through the coating zone at a spedd of 2 meters per minute or more, e.g. greater than 10 meters per minute, such as is often attained in the float process.

The invention includes a process for coating a continuous ribbon of glass which is in movement parallel with its longitudinal axis and in the same direction as the direction of gas flow along the flow passage, in which the gaseous medium flowing along the flow passage derives at least in part from a gas stream which enters the flow passage from a path which is at an angle of 45° or less to the face. Such a process can be performed quite conveniently in many existing flat glass production plants because a conduit or conduits for delivering the gas can be installed with little or no modification of the plant lay-out. The delivery of the gas stream at an angle of 45° or less to the face to be coated is moreover conducive to the formation of a coating of relatively homogenous or uniform structure, e.g. a structure featuring a regular arrangement of crystals.

The discharge of gases into the flow passage at an acute angle to the ribbon is favorable also for promoting the required non-turbulent flow of gaseous medium along the flow passage. If a process according to the invention is carried out so that the gaseous medium flowing along such passage derives from two or more gas feed streams separately discharged into the passage one above another, a nicely controlled flow of the medium along the passage can be achieved even if one or more but not all of such feed streams discharge at an angle of less than 45° to the ribbon. However, for best results, it is preferable for the mean angle of such discharging streams with respect to the ribbon to be less than 45°. In certain embodiments of the invention, the gaseous medium flowing along the flow passage derives from gas feed streams of different compositions which enter the passage from paths which are at an angle of 20°–35° to each other.

The discharge of gas streams into the flow passage at an inclination to the substrate as above described is a feature which can be adopted with advantage when coating an individual glass sheet or a part thereof. However, depending on circumstances in a given industrial plant, there will usually not be such a restricted choice of positions for the gas feed conduits as there is in a flat glass forming apparatus. When coating an individual sheet, one or more gas streams can be discharged into the flow passage parallel with the sheet if so required.

Preferably, the exhaust ducting is in the form of a chimney extending upwardly away from the substrate face being coated. The manner in which the flow takes place along the flow passage is influenced by the suction forces which exist at the exit of such flow passage. The use of a chimney extending upwardly away from the face has been found to be very beneficial for the quality of the coating. Other arrangements of the exhaust ducting are, however, possible. For example, the ducting may be arranged so that gases reaching the exit end of the flow passage are drawn off laterally through one or more transverse ducts. This is feasible particularly if the entry end portion of the ducting is subdivided into a series of side-by-side passageways, as hereafter referred to.

Advantageously, an exhaust ducting is used comprising a plurality of separate passageways distributed in side-by-side relationship across substantially the whole width of the gas flow through the flow passage. The exhaust of gas via different exhaust ducting passageways or through different groups of passageways may be independently controlled, e.g. by means of independently controlable extractors, for achieving a required volume flow rate profile across the width of the flow passage.

Particular importance is attached to the performance of a process according to the invention for coating a ribbon of glass progressing from a float tank and in that field of application preference is given to processes in which the flow passage is located downstream of the exit end of the float tank and at a zone where the glass has a temperature in the range 100° to 650° C.

The invention includes apparatus suitable for use in carrying out a coating process according to the invention as hereinbefore defined. Apparatus according to the invention comprises means for supporting a substrate, means for heating the substrate, a shroud mounted in a position such that it defines with the substrate face to be coated a shallow flow passage, feeding means for discharging gaseous medium into such flow passage at one end thereof, and exhaust ducting into which the opposite end of said shallow flow passage leads for exhausting residual medium away from such passage.

Apparatus according to the invention as above defined may embody any one or more features enabling any one or more of the various optional process features hereinbefore described to be employed. Reference is made in particular to the placing of the shroud to define with the substrate, when it is supported in the apparatus, a flow passage the height of which (measured normally to the substrate face to be coated) is at no point in excess of 40 mm; to the use of a shroud which forms a tapering flow passage and to the use of a shroud which is not more than 2.0 meters and not less than 10 cm in length. As will also be apparent from the description of the various preferred process features, the substrate supporting means is preferably arranged for displacing a substrate in the same direction as the direction in which gas flows along shallow flow passage.

Insofar as the gas feed means is concerned, it is preferable to employ one or more feed conduits arranged for discharging a stream or streams of gas at an angle to the substrate as hereinbefore referred to.

The exhaust ducting preferably comprises a chimney extending upwardly from the exit end of the shroud. The chimney is advantageously shaped so that its rear wall slopes upwardly and rearwardly from the bottom of the chimney, relative to the chimney front. This shaping has been found to have a favorable influence on the flow of gaseous medium along and out of the shallow flow passage.

In a particularly favored form of apparatus according to the invention, the gas feed means comprises a slot-like discharge mouth extending across the widthwise dimension of the shallow flow passage and the exhaust ducting comprises a plurality of separate passageways distributed in side-by-side relationship across substantially the whole width of such flow passage. The exhaust ducting may comprise a conduit forming a chimney fitted with an extractor, e.g., a fan, and having a slot-like entry portion extending over the width of the shroud at its exit end, such entry portion being internally subdivided by internal baffles or partitions into a said series of exhaust passageways.

Various processes and apparatus according to the invention will now be described, merely by way of example. In these examples reference is made to the forms of apparatus according to the invention which are shown by way of example in the accompanying diagrammatic drawings.

EXAMPLE 1

Figure 1:
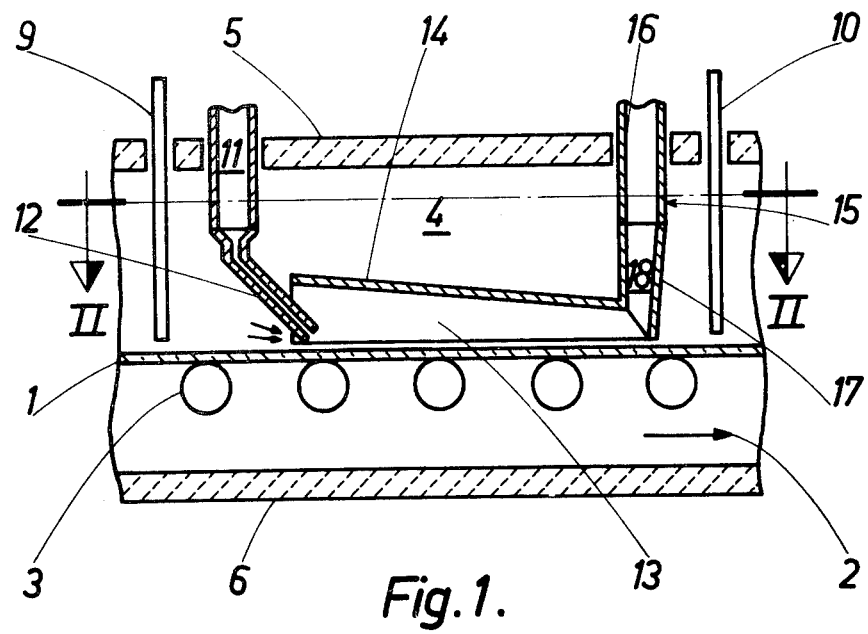
FIG. 1 is a diagrammatic side view, partly in vertical section, of one coating apparatus embodying the invention.
Figure 2:
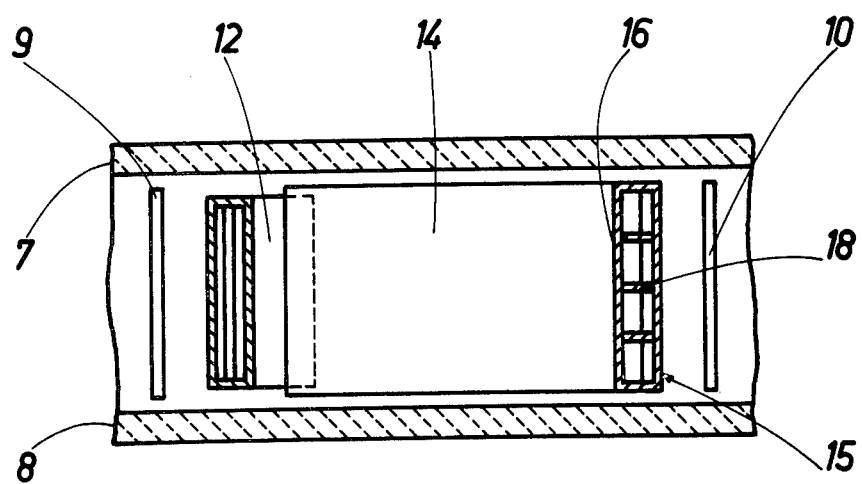
FIG. 2 is a cross-sectional view taken along the line II—II of FIG. 1.

Coating apparatus as represented in FIGS. 1 and 2 was used for coating a ribbon of glass 1 traveling in the direction indicated by arrow 2 from a float tank (not shown) in which the glass ribbon was formed by a float process on a bath of molten tin. The glass ribbon had a speed of 15 meters per minute and was supported at the coating station by rollers 3.

The coating station is located in a compartment 4 of a horizontal gallery having a refractory roof 5, a refractory sole wall 6 and refractory side walls 7 and 8, the ends of the compartment being formed by displaceable refractory screens 9, 10. The coating apparatus may be disposed within a part of the gallery in which the glass ribbon is annealed, or at a position between the float tank and the annealing gallery.

The coating apparatus comprises a vessel 11 containing a gas mixture and having a feed channel 12 extending across substantially the full width of the glass ribbon. The feed channel 12 intrudes into the entry end of a shallow flow passage 13 defined in part by a shroud 14 and in part by the top face of the glass ribbon. The top of the shroud 14 is inclined slightly downwardly in the gas flow direction so that the gas flow passage 13 slightly decreases in height toward its gas exit end. The length of the passage 13 is 50 cm and its height varies from 25 mm at its entry end to 10 mm at its gas exit end. At such exit end the shroud is connected to a chimney 15. The front wall 16 of the chimney is vertical but the lower portion 17 of its rear wall slopes upwardly and rearwardly relative to such front wall.

The chimney 15 is internally subdivided by partitions such as 18 into a plurality of exhaust passageways distributed in side-by-side relationship across substantially the whole width of the gas exhaust path.

A vapor mixture containing $SnCl_4$ and $SbCl_5$ was generated from a liquid phase containing such ingredients in a volume ratio of 100:1 and this vapor mixture, entrained in a stream of nitrogen, was delivered from vessel 11 through the feed channel 12.

The temperature of the glass ribbon at the region beneath the entry end of the flow passage 13 was of the order of 585° C.

The rate of delivery of the vapor mixture into the flow passage 13 and the draught forces through the chimney 15 were regulated so as to establish along said passage a substantially turbulent-free flow of vapor mixed with air induced into the passage by the discharge of the vapor stream, as suggested by the arrows beneath the feed channel 12. Such regulation was, moreover, such that a coating composed essentially of $SnO_2$ together with a small quantity of $Sb_2O_5$ serving as doping agent, and having a thickness of 2,500 Å, was formed on the traveling glass ribbon. Regulation of the draught forces can be achieved, e.g. by using a regulatable fan in the chimney 15.

The coating on the glass had a green tint viewed by reflected light. The coated glass had a very high visible light transparency but reflected a significant proportion of incident radiation in the far infrared spectral region.

The emissivity of the coating was 0.4; its diffuse luminous transmission was practically nil.

Examination of the coating showed that it had a homogenous structure and had uniform thickness and optical properties.

A coating method as above described can be performed in the same way for coating a continuous ribbon of sheet glass traveling from the drawing chamber of a Libbey-Owens type drawing machine. For example, the compartment 4 can equally well be regarded as located within the annealing gallery adjoining such drawing machine.

EXAMPLE 2

A coating process was performed in the same way as Example 1 but the vapor mixture forming the coating composition derived from a solution of stannous acetate and a small proportion of $SbCl_3$ in glacial acetic acid, the $SbCl_3$ being added as doping agent.

The vapor mixture from this solution was entrained into contact with the glass ribbon in a stream of nitrogen from which all traces of oxygen had been removed. The glass ribbon had a temperature of the order of 585° C. at the place of initial contact by the vapor mixture. The glass ribbon speed was 6 meters per minute.

A coating of $SnO_2$ together with a small quantity of antimony oxide and having a thickness of 4000 Å, was formed on the glass ribbon. The delivery rate of the vapors along feed channel 12 and the draught forces through the chimney 15 were regulated so that the vapors were maintained in substantially turbulent free flow along flow passage 13 and the coating oxides were formed substantially only at the boundary layer of vapor in contact with the hot glass ribbon.

The coating had a greenish tint, viewed by reflected light. The coating had a high transparency to light in the long wavelength region of the visible spectrum and reflected a significant proportion of incident radiation in the far infrared wavelength band.

The emissivity of the layer was 0.3. The diffuse luminous transmission of the coating was practically nil.

The thickness of the layer and its optical properties appeared to be truly uniform and its structure was homogenous over the whole area of the coating.

In another process according to the invention, coatings of good quality were formed by following a procedure as just described but using as the feed stock vapors of $ZrCl_4$ entrained in a stream of dry air. A layer of $ZrO_2$ was formed having a grey tint viewed by reflected and by transmitted light.

EXAMPLE 3

Using a coating apparatus as represented in FIGS. 1 and 2 and described in Example 1, vapors of titanium isopropylate $Ti(OC_3H_7)_4$ entrained in a current of nitrogen were delivered through the feed channel 12, to contact a glass ribbon where its temperature was of the order of 605° C. The ribbon speed was 7 meters per minute.

The rate of delivery of the vapor mixture and the aspiration of gases from the flow passage 13 into the chimney 8 were regulated so as to establish a substantially non-turbulent vapor flow along passage 13 and so that a coating layer of $TiO_2$ having a thickness of 550 Å was formed on the glass ribbon.

The coating appeared white by reflected light. The refractive index of the coating was 2.49. The diffuse luminous transmission of the coated glass was practically nil.

Examination of the coating showed that its thickness, structure and optical properties were substantially uniform.

EXAMPLE 4

Figure 3:
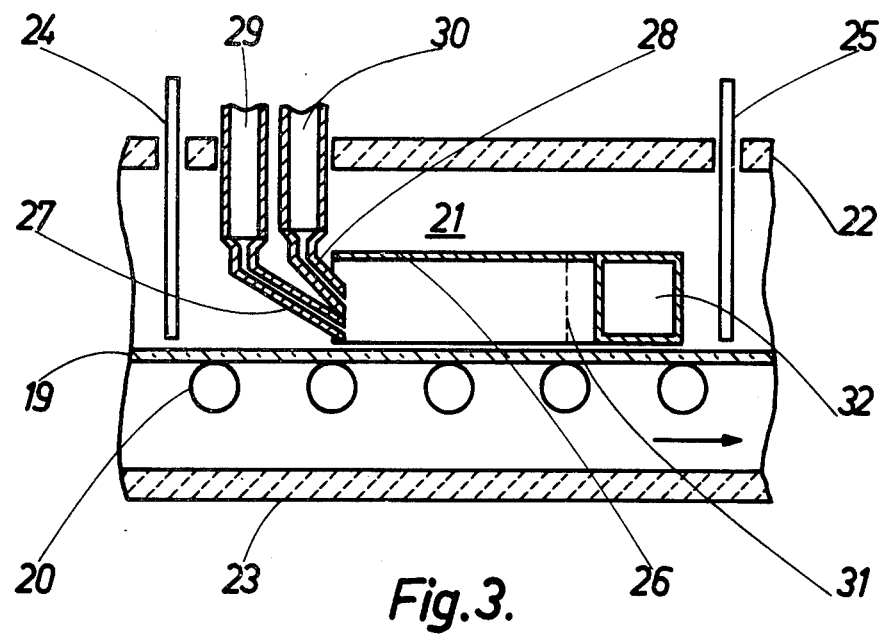
FIG. 3 is a view similar to FIG. 1 of a second coating apparatus embodying the invention.

Coating apparatus as represented in FIG. 3 was used for coating a glass ribbon 19 during its conveyance on rollers 20 through a compartment 21 of a gallery having refractory roof and sole walls 22, 23. The compartment 21 has end walls formed by displaceable refractory screens 24, 25. The coating apparatus comprises a shroud 26 defining with the top face of the longitudinally moving glass ribbon 19 a shallow gas flow passage having a length of 40 cm and a uniform height of 15 mm extending over substantially the full width of the glass ribbon. Twin feed channels 27 and 28 lead from gas reservoirs 29 and 30 respectively into the entry end of the horizontal flow passage beneath the shroud 26. The feed channel 27 is inclined at an angle of 30° to the glass ribbon, whereas the angle of inclination of the feed channel 28 is 50°. At its exit end the horizontal flow passage is subdivided by vanes such as 31 into a plurality of side-by-side exit portions which lead into exhaust ducting 32. This ducting comprises two horizontal exhaust tubes disposed at right angles to the londigutinal axis of the shroud 26 and leading in opposite directions therefrom. Each of such tubes was provided with an extractor fan (not shown).

A ribbon of glass was conveyed through the coating station at a speed of 17 meters per minute. The temperature of the glass at the coating station was 580° C. Vapors of iron acetylacetonate entrained in a current of dry nitrogen were fed along feed channel 27. A current of oxygen was delivered along feed channel 28. The rate of feed of the gases through the feed channels 27 and 28 and the aspirating forces acting via the exhaust ducting were regulated in such manner that the mixture of gases deriving from feed channels 27 and 28 was maintained in substantially turbulent free flow along the flow passage beneath shroud 26 and a coating of $Fe_2O_3$ having a thickness of the order of 500 Å was formed on the glass ribbon. The coating appeared yellow-amber by transmitted light. Examination of the coating showed that its structure was homogenous and that it had uniform thickness and optical properties.

By appropriate choice of the starting materials a coating of cobalt oxide can be formed in a similar manner. By employing a suitable mixture of vapors, coatings having different colorations and comprising a mixture of oxides, e.g. a mixture of oxides in the group $Fe_2O_3$, $Co_3O_4$ and $Cr_2O_3$, can be formed.

In the above coating method the gallery in which the compartment 21 is located is an annealing gallery connected to a float tank. This coating method could also be performed for coating a ribbon of float glass before admission in the annealing gallery. It could, as well, be performed for coating a glass ribbon of some other origin, e.g. a ribbon formed in a Libbey-Owens drawing machine.

Coating apparatus as described with reference to FIG. 3 could be employed in a similar manner for coating individual sheets of glass during their transportation through a coating station.

EXAMPLE 5

By means of apparatus as used as shown in FIG. 3, coatings of various compositions of uniform thickness and optical properties, and having a homogenous structure, were formed on ribbons of glass in course of their manufacture.

The Table below gives the reactants employed for forming such coatings, also the temperature of the glass on contact thereof by the reactants the composition of the formed coating and certain properties thereof.

In each case dry nitrogen was employed as inert carrier for the reactants, and the coating was effected in an environment free from oxygen. The coated glass was kept out of contact with air until the temperature of the glass was sufficiently low to avoid risk of chemical modification of the coating.

TABLE

| 1st Reactant, fed through passage 27 | 2nd Reactant, fed through passage 28 | Glass Temp. °C | Composition of formed coating | Properties of coating |
| --- | --- | --- | --- | --- |
| $Pb(C_2H_5)_4$ | $H_2S$ | 200 | PbS | Grey in reflection, yellow-brown in transmission, for thickness of 500Å |
| $SiH_4$ | $NH_3$ | 600 | $Si_3N_4$ | Very chemically stable; refractive index near that of glass; thus nearly invisible |
| $Cr(CO)_6$ | $CH_4$ | 150 | $Cr_3C_2$ | Hard; acid-resistant; light-reflecting; grey-neutral in transmission |
| $Ga(CH_3)_3$ | $(CH_3)_2AsCN$ | 250 | GaAs | Semiconductive |

Sheets of glass can be coated under the same conditions.

EXAMPLE 6

A ribbon of glass was coated using apparatus as represented in FIG. 3. On reaching the coating station, the glass ribbon had a temperature of 600° C. The ribbon was exposed at the coating station to an atmosphere free from oxygen and enriched in hydrogen.

Vapors of vanadium chloride ($VCl_4$) entrained in a stream of hydrogen were fed to the glass along feed channel 27. Boron bromide vapors ($BBr_3$) entrained in a stream of hydrogen were fed through feed channel 28.

At a coating zone within the shroud 26 a coating of vanadium boride ($VB_2$) formed on the glass ribbon. The coating appeared grey. The successively coated portions of the ribbon were not brought into contact with air until their temperature had fallen sufficiently to avoid risk of chemical modification of the coating.

Coatings of metallic silicon can be formed in similar manner by exposing the glass while at a temperature of 500° C. to vapors of silicum hydride ($SiH_4$). In such a process it is essential to protect the coating from oxidation.

Individual sheets of glass can be coated under the same conditions.

EXAMPLE 7

Figure 4:
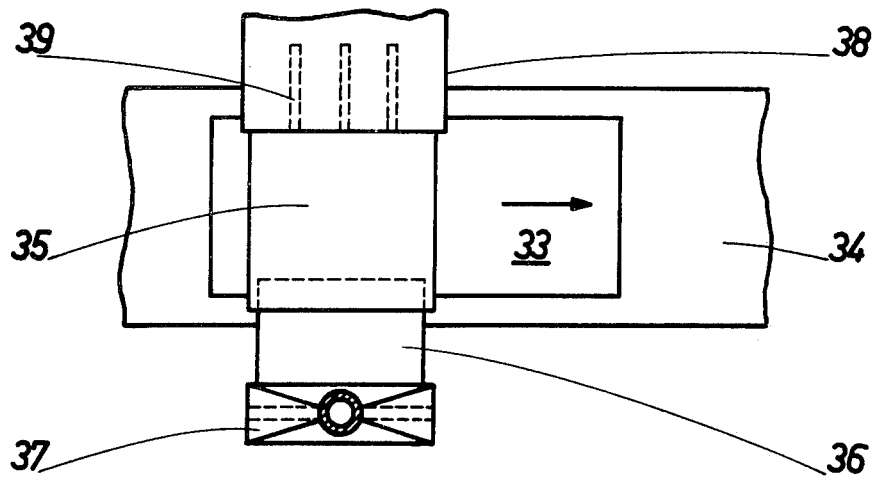
FIG. 4 is a view similar to FIG. 1 of a third coating apparatus embodying the invention.

Sheets of glass were coated in an apparatus as shown in FIG. 4. The glass sheets, one of which is shown and is designated 33, were placed on a conveyor 34 and transported thereby through a coating station. The glass sheets on reaching such station had a temperature of approximately 200° C.

At this coating station there is an enclosure (not shown) through which the conveyor 34 passes and within this enclosure there is a gas flow passage 35 through which a gas stream containing the precursor of the coating material is caused to flow in contact with the glass, in a direction transverse to the direction of movement of the glass sheets. A feed channel 36 leads horizontally to such flow passage from an entrance shaft 37. Surplus gases leaving passage 35 escape through exhaust ducting 38, the entry end of which is internally subdivided by partitions 39 into a plurality of side-by-side flow paths.

The length of the flow passage 35 (i.e. its dimension normal to the direction of movement of the glass sheets) is 1 m and its height is 20 mm.

The aforesaid enclosure at the coating station was kept filled with nitrogen, to the exclusion of oxygen, at slightly above atmospheric pressure in order to avoid inducement of air into the coating zone. Nickel carbonyl vapors, entrained in a stream of nitrogen, were delivered through feed channel 36. The rate of delivery of this feed stock and the rate of extraction of surplus gases through the exhaust ducting 38 were such as to establish a substantially turbulent-free flow along the passage 35 and insure that a coating was formed on the surface of the glass sheets, which coating was formed substantially exclusively by the decomposition of the organic substance at the boundary layer of vapor in contact with the hot glass sheets. The result was that a coating of nickel 100 Å in thickness, was formed on each glass sheet. The coatings appeared grey by transmitted and by reflected light. Each coating was of uniform thickness and had uniform structure and optical properties. The coatings uniformly transmitted light over a broad visible wavelength band. The coatings showed minimal diffuse luminous transmission.

By the control of the atmosphere to which the coatings formed on the sheets were exposed at the coating station and by keeping the temperature of the glass sheets on leaving the coating station sufficiently low, modification of the coatings on contact with air was avoided.

What is claimed is:

1. A process of forming a metal or metal compound coating on a face of a flat glas substrate which comprises the steps of contacting such face while it is at elevated temperature with a gaseous medium containing a substance in gaseous phase which undergoes chemical reaction or decomposition to form said metal or metal compound on said face, causing said gaseous medium to flow along said face as a substantially turbulent-free layer along a flow passage defined in part by the face of the glass and in part by a shroud, said flow of gaseous medium being caused in part by delivering a gas stream along a confined path which is at 45° or less to said face and discharging the gas stream from said path into said flow passage through a slot-like discharge mouth extending across the widthwise dimension of said flow passage, and drawing residual medium away from said face through exhaust ducting into which the flow passage leads, said flow passage tapering in the direction of gas flow therethrough at least over an end portion of its length leading up to said exhaust ducting.

2. A process as defined in claim 1 wherein the height of said flow passage, measured normally to said face, is at no point in excess of 40 mm.

3. A process as defined in claim 1, wherein the composition of said medium and the temperature conditions to which it is exposed are such that said coating forms on said face at a rate of at least 700 Å per second.

4. A process as defined in claim 1 wherein said flow passage occupies only an incremental portion of at least one dimension of the area to be coated and said flow passage and said substrate are relatively displaced so that the coating is formed progressively, on successive portions along said face.

5. A process as defined in claim 4, wherein said relative displacement occurs in a direction parallel with the direction in which gas flows along said flow passage.

6. A process as defined in claim 5, wherein said face is the top face of a ribbon of glass which is in continuous movement at a speed of at least 2 meters per minute, parallel with its longitudinal axis and in the direction of said gas flow.

7. A process as defined in claim 6, wherein the dimension of said flow passage measured in the direction of gas flow therethrough is not more than 2.0 meters.

8. A process as defined in claim 7, wherein the dimension of said flow passage measured in the direction of gas flow therethrough is not less than 10 cm.

9. A process as defined in claim 1, wherein a stream of oxygen-containing gas and a separate stream of a vaporized metal compound with which oxygen reacts to form a metal oxide coating on said face, are fed continuously into said flow passage.

10. A process as defined in claim 9, wherein said gaseous medium contains a vaporized tin compound and a tin oxide coating is formed on said face.

11. A process as defined in claim 9, wherein a gaseous medium containing said vaporized metal compound is continuously discharged into said flow passage and induces a flow of air into and along such passage.

12. A process as defined in claim 9, wherein the gaseous medium entering said flow passage comprises a layer of vaporized metal compound and a layer of oxygencontaining gas which is introduced between said layer of vaporized metal compound and said face.

13. A process as defined in claim 9, wherein the gaseous medium entering said flow passage comprises an upper layer of oxygen-containing gas and a layer of vaporized metal compound which flows beneath such upper layer.

14. A process as defined in claim 1, wherein said substrate is a ribbon of glass formed by the float process in a tank and said flow passage is located downstream of the exit end of the tank and at a zone where the glass has a temperature in the range 100° to 650° C.

15. A process as defined in claim 1, applied for coating a continuous ribbon of glass which is in movement parallel with its longitudinal axis and in the same direction as the direction of gas flow along said flow passage, wherein the gaseous medium flowing along said flow passage derives at least in part from a gas stream which enters said passage from a path which is at 45° or less to said face.

16. A process as defined in claim 15, wherein the gaseous medium flowing along said flow passage derives from a plurality of gas feed streams which enter said passage from paths whose average angle to said face is 45° or less.

17. A process as defined in claim 15, wherein the gaseous medium flowing along said flow passage derives from gas feed streams of different compositions which enter said passage from paths which are at an angle of 20°–35° to each other.

18. A process as defined in claim 1, wherein said exhaust ducting is in the form of a chimney extending upwardly away from said face.

19. A process as defined in claim 1, wherein said exhaust ducting comprises a plurality of separate passageways distributed in side-by-side relationship across substantially the whole width of the gas flow path through said flow passage.

20. A process as defined in claim 19, wherein the exhaust of gas via separate exhaust ducting passageways is separately controlled.

21. Apparatus suitable for use in forming a metal or metal compound coating on a face of a flat glass substrate by contacting such face while it is at elevated temperature with a gaseous medium containing a substance in gaseous phase which undergoes chemical reaction or decomposition to form said metal or metal compound on said face, said apparatus comprising:
means for supporting said substrate,
means for heating such substrate,
a shroud mounted in a position to define with the substrate face to be coated a shallow flow passage,
feeding means for discharging gaseous medium into said shallow flow passage at one end thereof, and
exhaust ducting into which the opposite end of said shallow flow passage leads for drawing residual medium away from said shallow flow passage,
said gas feeding means comprising at least one conduit disposed for delivering a stream of gas along a confined path which is at an inclination of less than 45° to the substrate face to be coated and has a slot-like discharge mouth extending across the widthwise dimension of said shallow flow passage through which the stream of gas delivered along said confined path is discharged into said shallow flow passage, said shroud being formed such that the flow passage tapers toward said opposite end thereof.

22. Apparatus as defined in claim 21, wherein said shroud is spaced from said substrate supporting means such that when a substrate is in position for coating, the height of the shallow flow passage, measured normally to said face, is at no point in excess of 40 mm.

23. Apparatus as defined in claim 21, wherein means is provided for displacing a substrate, while supported by said substrate supporting means, relative to said shroud and in the same direction as that in which gas flows along said shallow flow passage.

24. Apparatus as defined in claim 23, wherein the dimension of said shallow flow passage measured in the direction in which gas flows therethrough is not more than 2.0 meters and not less than 10 cm.

25. Apparatus as defined in claim 21, wherein said gas feeding means comprises at least one conduit disposed for discharging gaseous medium into said shallow flow passage and consequently inducing a flow of ambient air into said shallow flow passage.

26. Apparatus as defined in claim 21, wherein said gas feeding means comprises at least two conduits disposed for discharging streams of gases into said shallow flow passage as flow layers disposed one above the other.

27. Apparatus as defined in claim 21, wherein said gas feeding means comprises two or more conduits disposed for discharging streams of gas into said shallow flow passage along paths whose average angle to the substrate face to be coated is 45° or less.

28. Apparatus as defined in claim 21, wherein said gas feeding means comprises conduits disposed for discharging streams of gas into said shallow flow passage along paths which are at an angle of 20°–35° to each other.

29. Apparatus as defined in claim 21, wherein said exhaust ducting is in the form of a chimney extending upwardly away from said face.

30. Apparatus as defined in claim 29, wherein said chimney includes a bottom, a front, and a rear which slopes upwardly and rearwardly from said bottom relative to said front.

31. Apparatus as defined in claim 21, wherein said substrate supporting means is operable to support a ribbon of glass having a width of at least 2 meters and moving parallel with its longitudinal axis, the widthwise dimension of said shallow flow passage being at least 1.8 meters.

32. Apparatus as defined in claim 31, wherein said exhaust ducting comprises a plurality of separate exhaust passageways distributed in side-by-side relationship across substantially the whole width of the gas flow path through said shallow flow passage.

33. Apparatus as defined in claim 32, wherein means is provided for independently controlling the exhaust of gases through said separate exhaust passageways.

34. Apparatus as defined in claim 21, wherein said shallow flow passage is disposed downstream of a float tank for forming a ribbon of glass by the float process for coating the upper face of such ribbon where the glass has a temperature in the range 100° to 650° C.

* * * * *